United States Patent [19]

Furuse

[11] Patent Number: 5,013,006
[45] Date of Patent: May 7, 1991

[54] MICRO-LEAKAGE REGULATING VALVE

[75] Inventor: Akio Furuse, Hachioji, Japan

[73] Assignee: Cosmo Instruments Co., Ltd., Tokyo, Japan

[21] Appl. No.: 551,413

[22] Filed: Jul. 12, 1990

[30] Foreign Application Priority Data

Jul. 24, 1989 [JP] Japan ............................ 1-87260[U]
Feb. 16, 1990 [JP] Japan ............................ 2-14410[U]

[51] Int. Cl.$^5$ ............................ F16K 7/06; F16L 55/14
[52] U.S. Cl. ................................. 251/8; 73/1 G;
  73/3; 138/45; 251/205
[58] Field of Search .................... 73/1 G, 1 R, 3, 40,
  73/46; 138/41, 45, 46; 251/4, 5, 6, 7, 8, 9, 205,
  900; 137/312

[56] References Cited

U.S. PATENT DOCUMENTS

| | | | |
|---|---|---|---|
| 1,982,528 | 11/1934 | Mennesson | 73/3 |
| 2,586,984 | 2/1952 | Mier et al. | 251/9 |
| 2,827,257 | 3/1958 | Becker et al. | 251/9 |
| 2,908,476 | 10/1959 | Hidding | 251/8 |
| 2,959,954 | 11/1960 | Roberts | 73/3 |
| 3,118,646 | 1/1964 | Markey | 251/5 |
| 3,167,085 | 1/1965 | Redmer | 251/8 |
| 3,332,439 | 7/1967 | Burke | 251/8 |
| 3,512,748 | 5/1970 | Wilson | 251/205 |
| 3,831,600 | 8/1974 | Yum et al. | 251/8 |
| 3,848,634 | 11/1974 | Noiles | 251/8 |
| 4,312,493 | 1/1982 | Stauffer | 251/8 |
| 4,343,176 | 8/1982 | Basford et al. | 73/1 G |
| 4,591,093 | 5/1986 | Elliott, Jr. | 73/3 |
| 4,787,406 | 11/1988 | Edwards et al. | 251/8 |

FOREIGN PATENT DOCUMENTS

| | | | |
|---|---|---|---|
| 1202447 | 1/1960 | France | 251/5 |
| 596483 | 3/1978 | Switzerland | 251/7 |
| 1202949 | 8/1970 | United Kingdom | 251/5 |

*Primary Examiner*—George L. Walton
*Attorney, Agent, or Firm*—Pollock, Vande Sande and Priddy

[57] ABSTRACT

A micro-leakage regulating valve, in which a metal block has a through hole and a tapped hole extending from one side of the metal block and communicating with the through hole at the center thereof. The through hole has inserted therethrough a capillary metal tube. At one end of the through hole a sealing member provides a seal between the outer peripheral surface of the capillary metal tube and a surrounding wall surface of the metal block. An adjusting screw is screwed into the tapped hole, to crush the capillary metal tube to a desired degree, setting a desired flow rate.

9 Claims, 3 Drawing Sheets

MICRO-LEAKAGE REGULATING VALVE

BACKGROUND OF THE INVENTION

The present invention relates to a micro-leakage regulating valve which is capable of generating a reference leakage for calibrating a leakage measured by leakage test equipment.

Leakage test equipment is used to test containers which must be free from leakage of gas or liquid, or gas fittings. The test equipment applies a fixed pneumatic pressure to the device under test and a leak-free reference container of the same content volume as the device under test, monitors the difference in internal pressure between the device under test and the reference container, and measures the differential pressure to thereby make a check for leakage.

In such a leakage test equipment the sensitivity for detecting leakage is calibrated by:
 (A) generating a known amount of leakage at the side of the device under test, or
 (B) changing the content volume of the device under test by a known value so that the resulting differential pressure produces the same effect as that by leakage.

With method (A), when the amount of leakage is relatively large, it can be set to a desired value by use of the existing throttle valve or the like. In the case where the amount of leakage is, for example, as small as 1 cc or less per minute, it cannot be set by the conventional means, and even if it can be set, the set state is unstable.

The method (B) is suitable for reproducing a very small amount of leakage, but this method calls for conversion between a volume change and the amount of leakage, and hence consumes much time for calibration. On this account, there is a strong demand for the implementation of a micro-leakage regulating valve which permits reproduction of a very small amount of leakage.

SUMMARY OF THE INVENTION

It is therefore an object of the present invention to provide a micro-leakage regulating valve which is capable of setting a very small amount of leakage and stably maintaining the set state for a long period of time.

According to the present invention, a metal block has a through hole and a capillary metal tube inserted therethrough, and a sealing member is disposed near one end of the through hole to provide sealing between the outer peripheral surface of the capillary metal tube and the surrounding wall surface of the metal block. Furthermore, the metal block has a tapped hole which communicates with the through hole and an adjusting screw is screwed into the tapped hole to properly crush the capillary metal tube inserted through the through hole.

With such a structure as mentioned above, gas flows in the capillary metal tube, because no gas is allowed to leak through a gap between the inner wall surface of the through hole made through the metal block and the outer peripheral surface of the capillary metal tube. Since the capillary metal tube can be properly crushed by the adjusting screw, the cross-sectional area of the capillary metal tube can be set to a very small value by the crushed portion. As a result of this, the amount of gas passing through the capillary metal tube can be limited to a very small value, thus constituting the micro-leakage regulating valve.

DESCRIPTION OF THE PREFERRED EMBODIMENTS

Figure 1:
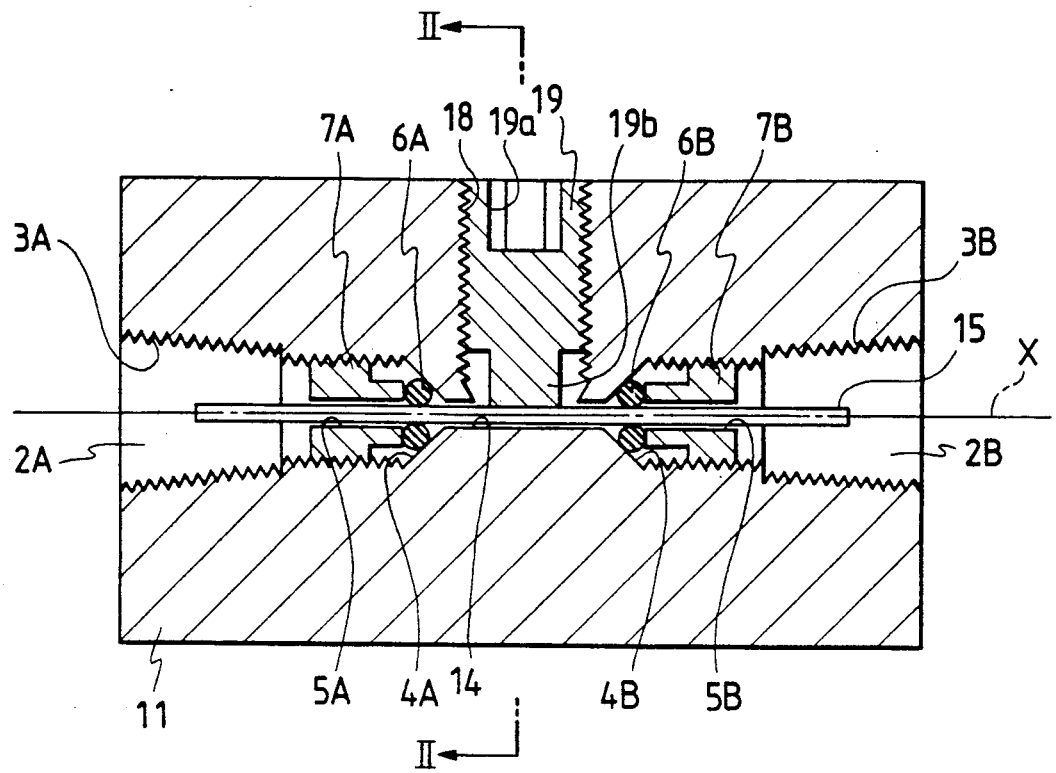
FIG. 1 is a sectional view illustrating an embodiment of the present invention.
Figure 2:
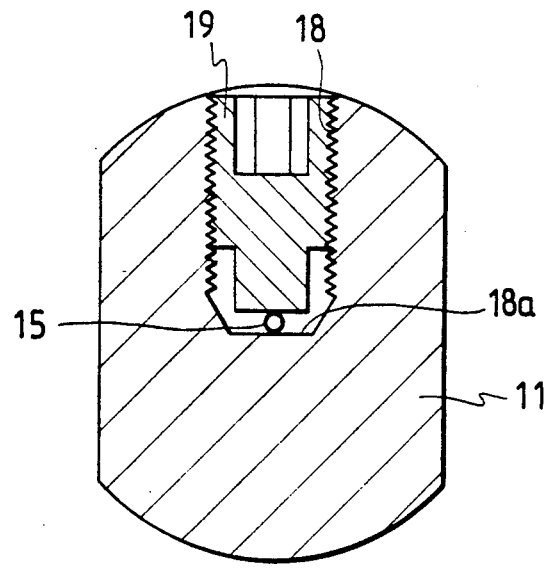
FIG. 2 is a sectional view taken on the line II—II perpendicular to the center axis X in FIG. 1.

FIG. 1 illustrates an embodiment of the present invention. Reference numeral 11 indicates a metal block which constitutes the body of the micro-leakage regulating valve of the invention. The metal block 11 has a cross-section such as shown in FIG. 2 in which diametrically opposite portions of a columnar body are flattened on both sides thereof in parallel to the center axis X.

The metal block 11 has in its two end faces a pair of opposed holes 2A and 2B made in alignment with each other along the center axis X. The holes 2A and 2B are tapped as indicated by 3A and 3B, for receiving couplings (not shown) by which the micro-leakage regulating valve is connected to, for example, a leak detector to be calibrated.

Figure 3:
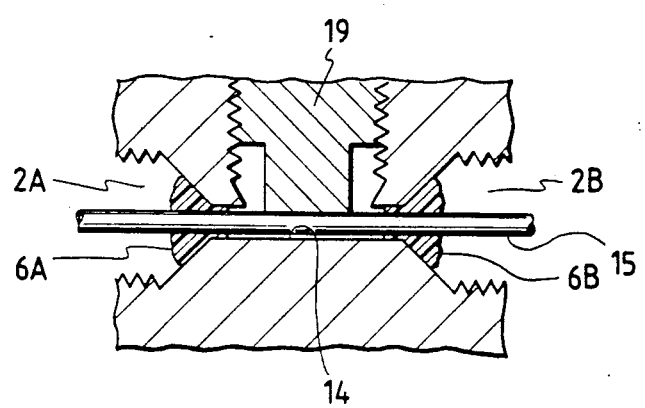
FIG. 3 is a sectional view showing an example which uses adhesive sealant as the sealing members 6A, 6B.

The holes 2A and 2B intercommunicate through a small-diametered through hole 14 which passes the centers of end walls 4A and 4B of the holes 2A and 2B along the center axis X. The through hole 14 has a capillary metal tube 15 inserted therethrough. The capillary metal tube 15 is a pipe of stainless steel, 0.8 mm in outer diameter and 0.5 mm in inner diameter, for instance. In this case, however, pipes of phosphor bronze and other metals can be employed. The through hole 14 has an inner diameter slightly larger than the outer diameter of the capillary metal tube 15. Sealing members 6A and 6B are used to prevent leakage through gaps between the outer peripheral surface of the capillary tube 15 and the inner wall of the through hole 14. The sealing members 6A and 6B are, for instance, O-rings of synthetic rubber, which are pressed by screws 7A and 7B against the end walls 4A and 4B of the holes 2A and 2B to seal gaps between the outer peripheral surfaces of the capillary tube 15 and the end walls 4A and 4B. The screws 7A and 7B are each composed of a large-diametered portion threaded over the entire area of its outer peripheral surface and a small-diametered portion. The screws 7A and 7B respectively have through holes 5A and 5B extending through the large- and small-diametered portions thereof along the center axis X. The small-diametered portions of the screws 7A and 7B press, at the front end faces thereof, the O-rings 6A and 6B against the end walls 4A and 4B of the holes 2A and 2B. As shown in FIG. 3, adhesives or sealants of the epoxy resin series or some other resins may be employed for air-tight sealing in place of the O-rings. In such a case, the screws 7A and 7B are unnecessary.

Furthermore, the metal block 11 has a tapped hole 18 extending from one side thereof at right angles to the through hole 14 and communicating therewith substantially centrally thereof. The tapped hole 18 extends down below the capillary tube 15 and to a position where the bottom 18a of the hole 18 substantially coincides with the inner wall of the through hole 14 as depicted in FIG. 2. By tightening an adjusting screw 19 screwed into the tapped hole 18 the portion of the capillary metal tube 15 exposed in the tapped hole 18 can be crushed.

The adjusting screw 19 has a hexagonal hole 19a extending axially thereof and has at its front end a small-diametered projection 19b coaxial with the screw 19. The projection 19b is greater in diameter than the capillary metal tube 15 and its tip end face is shown to be flat but may also be spherical, in which case the bottom 18a of the tapped hole 18 may be concave. The adjusting screw 19 may preferably be a self-locking screw which is free from accidental unscrewing.

In the case of setting the micro-leakage regulating valve of FIG. 1 to a desired leakage (flow rate), a pressure controllable compressed air source (not shown) is connected to, for instance, the hole 2A to supply air of a fixed pressure, for example, 1 kg/cm$^2$, and a flowmeter (not shown) is connected to the hole 2B. The capillary tube 15 is gradually crushed by turning the adjusting screw 19 while observing the flow rate being measured by the flowmeter and the tightening of the adjusting screw 19 is stopped when a desired flow rate is reached. The flow rate set to a desired value by such gradual crushing of the capillary metal tube 15 can be maintained stably for a long period of time, because the shape of the capillary metal tube 15 deformed as mentioned above stably remains unchanged. Hence the valve of the present invention can be utilized for the calibration of leakage test equipment or employed in equipment which calls for a fixed microflow rate.

Figure 4:
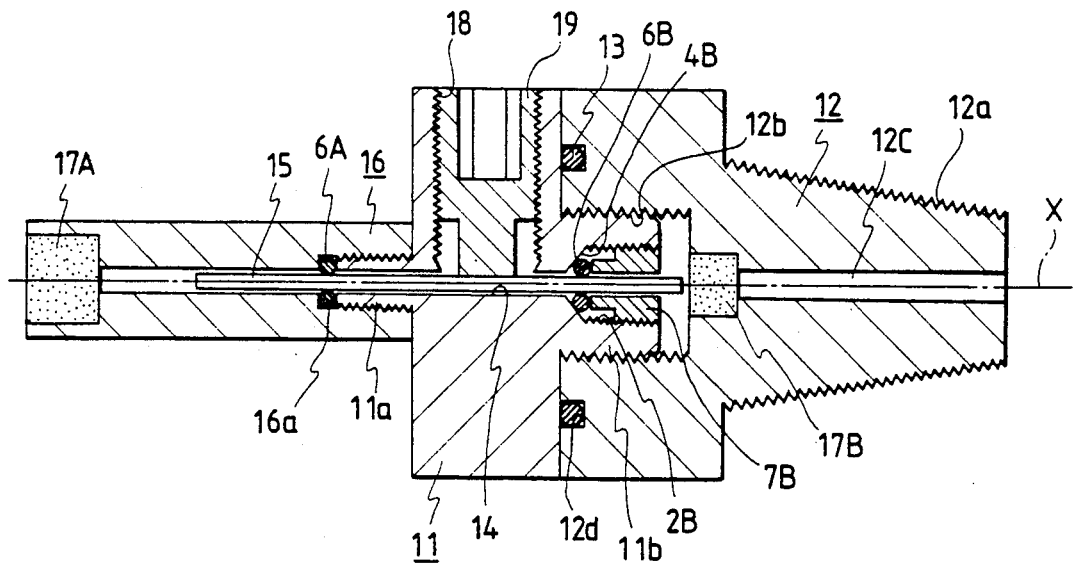
FIG. 4 is a sectional view illustrating a second embodiment of the present invention.

FIG. 4 illustrates a second embodiment of the present invention, in which the parts corresponding to those in FIG. 1 are identified by the same reference numerals. In this embodiment the metal block 11 has at one end a threaded sleeve 11a formed integrally therewith and at the other end a threaded pedestal mount 11b formed integrally therewith. The sleeve 11a and the mount 11b are coaxial with the metal block 11. The pedestal mount 11b has the tapped hole 2B coaxial therewith as in the embodiment of FIG. 1, and also in this embodiment the metal block 11 has the through hole 14 which extends therethrough passing through the center of the end wall 4B of the hole 2B and along the axis of the sleeve 11a. As in the embodiment shown in FIG. 1, the through hole 14 communicates with the tapped hole 18 extending at right angles thereto from one side of the metal block 11 and the adjusting screw 19 is screwed into the tapped hole 18 for crushing the capillary metal tube 15 inserted through the through hole 14. The O-ring 6B is pressed by the screw 7B against the end wall 4B of the hole 2B for sealing the gap between it and the peripheral surface of the capillary metal tube 15.

The pedestal mount 11b is screwed into a tapped hole 12b of a pedestal 12, which has an O-ring 13 held in an annular groove 12d cut in its contact surface with the metal block 11 for sealing the engagement between the metal block 11 and the pedestal 12. The pedestal 12 has a through hole 12c and a filter 17B disposed at one end thereof, i.e. at the bottom of the tapped hole 13b in this example, for preventing adherence of dust to the inner wall surface of the capillary metal tube 15 which causes a conductance change. A threaded portion 12a of the pedestal 12 can be attached to a pneumatic system (not shown).

A protective tube 16 is thread-mounted at one end thereof on the sleeve 11a of the metal block 11 so that an O-ring 6A held between an inwardly protrusive stepped portion 16a in the protective tube 16 and the tip of the sleeve 11a is pressed therebetween to seal between the outer peripheral surface of the capillary metal tube 15 and the sleeve 11a and between the sleeve 11a and the inner peripheral surface of the protective tube 16. A filter 17a may also be provided at the other end of the protective tube 16, as required.

Figure 5:
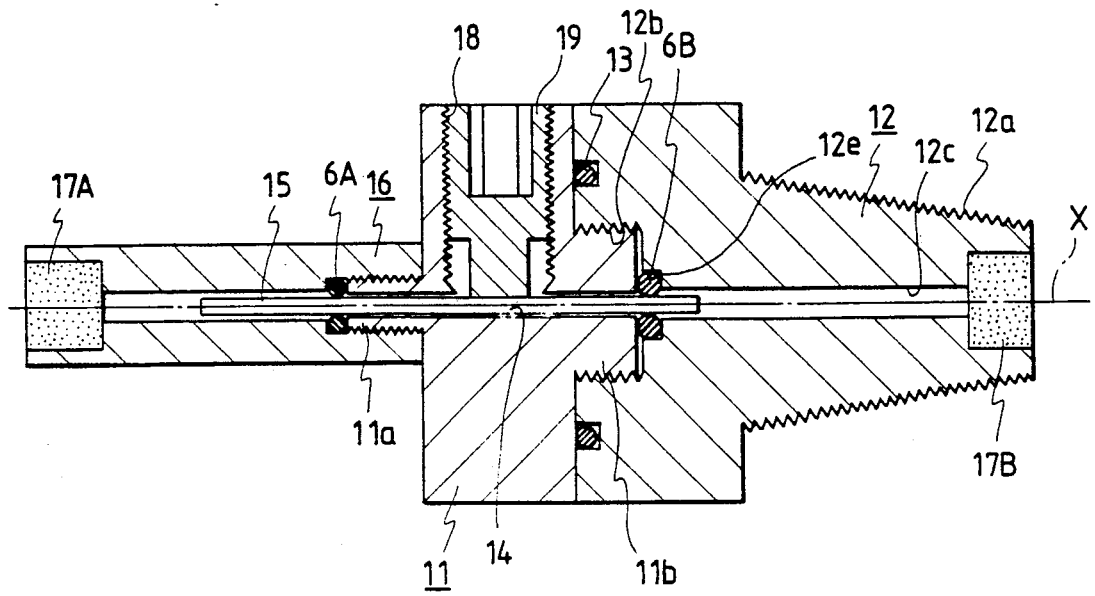
FIG. 5 is a sectional view illustrating a third embodiment of the present invention.

FIG. 5 illustrates another embodiment of the present invention, in which such a screw 7B as shown in FIG. 4 is not used but instead the pedestal mount 11b is used to perform the same function as that of the sleeve 11a, and the pedestal 12 serves also as a screw for pressing the sealing member 6B. The pedestal 12 has in the end wall of its tapped hole 12b a circular recess 12e coaxial with the through hole 12c. An O-ring as the sealing member 6B is disposed in the recess 12e and is urged against the end face of the pedestal mount 11b. The filter 17B is disposed at the end of the through hole 12c on the opposite side from the metal block 11. This embodiment is identical in construction with the embodiment of FIG. 4 except for the above, but the O-ring 13 need not always be provided. In the case where a resin adhesive is used as the sealing member 6B to seal the gap between the outer peripheral surface of the capillary metal tube 15 and the pedestal mount 11b, the O-ring 13 is needed.

While in the above arrangements sealing is provided at both ends of the through hole 14 between the outer peripheral surface of the capillary metal tube 15 and the surrounding wall surfaces of the metal block 11, it is obvious that such sealing is not needed on the discharge side if a gas needs only to be discharged through the capillary metal tube 15 into the atmosphere at a fixed flow rate, for example. That is, if the gas is to be let out into the atmosphere through the tapped hole 2A in FIGS. 1 and 3, for example, the sealing member 6A and the screw 7A are not necessary, and if the gas is to be let out into the atmosphere at the side of sleeve 11a in FIGS. 4 and 5, the sealing member 6A is not required.

Figure 6:
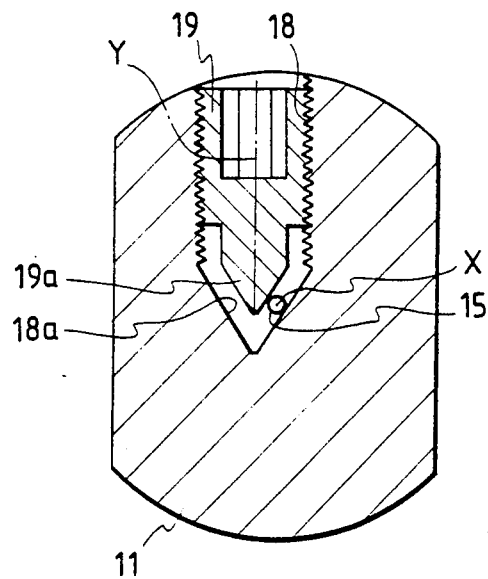
FIG. 6 is a sectional view showing modified forms of the tip end portion of an adjusting screw 19 and a tapped hole 18.

Although in the above arrangements the capillary metal tube 15 is urged by the tip end face of the adjusting screw 19 against the flat bottom 18a of the tapped hole 18 at right angles thereto as depicted in FIG. 2, the present invention is not limited specifically thereto. FIG. 6 illustrates in cross-section still another embodiment of the present invention, in which the center axis Y of the tapped hole 18 is displaced laterally so as not to pass through the center axis X of the through hole 14 and the end wall of the tapped hole 18 is tapered conically as indicated by 18a and is inscribed with the inner peripheral surface of the through hole 14 at a position below the capillary metal tube 15. The tip end portion 19a of the adjusting screw 19 is conically tapered and the capillary metal tube 15 is crushed between the conically tapered end portion 19a of the adjusting screw 19 and the tapered end wall 18a of the tapped hole 18. In such an instance, letting the distance of movement of the adjusting screw 19 in the direction of its center axis (i.e. in the Y-axis direction) and the angle of the tapered surface 18a with respect to the Y axis be represented by $y$ and $\theta$, respectively, the distance of approach of the tapered conical portion 19a to the tapered surface 18a is given by $y\sin\theta$. In other words, the distance of movement of the adjusting screw 19 at right angles to the tapered end wall 18a of the tapped hole 18 is short relative to the distance of movement of the adjusting screw 19 in the Y-axis direction. Hence this structure allows ease in fine control of the degree of crushing the capillary metal tube 15.

As described above, according to the present invention, the portion which is to act as a throttle of the leakage regulating valve is constructed so that the capillary metal tube 15 is crushed by the adjusting screw 19. Hence this structure is capable of stably maintaining the very small cross-sectional area for a long period of time and, consequently, can be employed as a reference for accurately setting a very small leakage.

It will be apparent that many modifications and variations may be effected without departing from the scope of the novel concepts of the present invention.

What is claimed is:

1. A micro-leakage regulating valve comprising:
   a metal block;
   a through hole extending through said metal block;
   an adjusting tapped hole in said metal block which extends from a side of said block to said through hole at substantially right angles thereto to communicate with said through hole, said adjusting tapped hole having a diameter greater than said through hole and having a bottom face located within said block in spaced relation to said side of said block;
   a capillary metal tube having a diameter slightly smaller than said through hole, said capillary metal tube being disposed in said through hole between said side of said block and said bottom face of said adjusting tapped hole, the opposite ends of said capillary metal tube projecting out of the opposite ends of said through hole;
   seal means disposed near at least one of said opposite ends of said through hole to hold an intermediate portion of the metal tube in place and to provide a seal between an outer peripheral surface of said capillary metal tube and a surrounding wall surface of said metal block said capillary metal tube extending through said seal means and having a free end portion outward of said intermediate portion that projects beyond said seal means; and,
   an adjusting screw screwed into said adjusting tapped hole, said adjusting screw having a tip end face for pressing a side portion of said capillary metal tube against said bottom face of said adjusting tapped hole to crush said capillary metal tube to a desired degree determined by the extent to which said adjusting screw is screwed into said adjusting tapped hole.

2. The valve of claim 1, wherein said seal means includes: an O-ring disposed around one of said projecting ends of said capillary metal tube; pressing means having a through hole for receiving said one of said projecting ends of said capillary metal tube for pressing said O-ring against said wall surface of said metal block; and screw means for moving said pressing means relative to said metal block in the axial direction of said through hole to press said O-ring against said wall surface.

3. The valve of claim 2, wherein said screw means includes a tapped hole made in said metal block coaxially with said through hole and a threaded portion provided over the outer peripheral surface of said pressing means, said pressing means being screwed into said tapped hole to press said O-ring against an end wall of said tapped hole.

4. The valve of claim 2, wherein said screw means includes a threaded portion of said metal block provided coaxially with said through hole and a tapped hole made in said pressing means for threaded engagement with said threaded portion, said threaded portion being screwed into said tapped hole to press said O-ring against an end wall of said tapped hole.

5. The valve of claim 1, wherein said seal means is an adhesive resin for providing a seal between the outer peripheral surface of said capillary metal tube and the inner wall surface of said through hole.

6. The valve of claim 1, wherein said adjusting screw is a self-locking screw.

7. The valve of claim 1, further including second seal means disposed at other end of said through hole, for providing another seal between the outer peripheral surface of said capillary metal tube and a surrounding wall surface of said metal block.

8. The valve of claim 7, wherein said second seal means includes: an O-ring disposed around one of the projecting ends of said capillary metal tube, pressing means having a through hole for receiving said one of said projecting ends of said capillary metal tube for pressing said O-ring against a wall surface of said metal block; and screw means for moving said pressing means relative to said metal block to press said O-ring against said wall surface of said metal block.

9. The valve of claim 8, wherein said screw means includes: a threaded portion provided on said metal block coaxially with said through hole and a tapped hole made in said pressing means for threaded engagement with said threaded portion, said threaded portion being screwed into said tapped hole to press said O-ring against an end wall of said tapped hole.

* * * * *